United States Patent [19]

Kohout et al.

[11] 4,035,773

[45] July 12, 1977

[54] CONTROL OF LEAKAGE CURRENTS IN A SWITCHING MATRIX

[75] Inventors: Otto J. Kohout, Addison; Gerald M. Rinaldi, Mundelein, both of Ill.

[73] Assignee: GTE Automatic Electric Laboratories Incorporated, Northlake, Ill.

[21] Appl. No.: 744,077

[22] Filed: Nov. 22, 1976

[51] Int. Cl.$^2$ .......................................... H04M 3/00
[52] U.S. Cl. ...................... 340/166 S; 179/18 GF; 340/166 R
[58] Field of Search .................... 340/166 R, 166 S; 179/18 GE, 18 GF

[56] References Cited

U.S. PATENT DOCUMENTS 3,838,227  9/1974  Danielsen .................. 340/166 S

Primary Examiner—Harold I. Pitts

[57] ABSTRACT

A switching matrix arrangement using magnetic latching reed relays is disclosed, wherein similarly numbered switch groups and verticals are connected in common and are driven simultaneously with the exception of a grid select signal which is unique to a particular grid. Further as a check on the operation of the grid various sensors are located throughout the network to monitor the selector. Because of the multiple connections leakage current which flows from the unselected groups may cause operation of unselected group monitor sensors. To prevent this a combination sensor and current sink is used that shunts the leakage currents around the sensor.

5 Claims, 6 Drawing Figures

SWITCH SENSOR

Y VERTICLE SENSOR 4,035,773

CONTROL OF LEAKAGE CURRENTS IN A SWITCHING MATRIX

BACKGROUND OF THE INVENTION

1. Field of the Invention

This invention relates generally to space-divided telephone communication networks, and more particularly, to an arrangement for controlling the effects of leakage current on the operation of the network.

2. Description of the Prior Art

Communication systems that have switching matrices controlled by common electronic circuits, require means for testing different paths through the matrices before or during their functioning to correctly complete paths through them. The tests are required to prevent cross-connection to communication paths already established or to prevent the establishment of multiple paths.

A typical such arrangement for checking for an undesirable multiplicity of matrix paths is disclosed in U.S. Pat. No.3,646,368 issued on Feb. 29, 1972 and assigned to the present assignee. In this disclosed arrangement the testing is performed prior to the operation of the crosspoints. Thus there is introduced an interval of time for the testing operation that contributes to the overall operate time for establishing a telephone connection.

SUMMARY OF THE INVENTION

It is therefore an object of this invention to provide a new and improved current sensing arrangement whereby the testing can be performed as the matrix path is being pulled.

The basic switching unit of the present disclosure is a grid. A grid is organized into four groups (modules) of sixteen each for each frame. Paths through the network in each frame are chosen by the network controller by driving a module select lead, to narrow the path to one of the four modules, a grid select lead, to narrow it down to one grid of the sixteen, and particular X and Y switch numbers and particular X and Y vertical numbers to pick the particular path on the grid. All similarly numbered switches and verticals in a module are connected in common and are, therefore, driven simultaneously. For a set operation in the selected module, all of the grids receive all of the selection signals to establish a path with the exception of the grid select signal which only goes to the selected grid. Since the pulser voltage is established across the fifteen unselected grids, leakage current will flow from the pulser, through the grid and into the Y vertical leads.

This disclosure describes a method for controlling the cumulative leakage from all of the silicon controlled rectifiers used as switches in the selected module to prevent them from turning on one or more of the Y vertical sensors.

The combination sensor and current limiter described here safely shunts the leakage current away from the Y vertical sensors, permitting them to be of high input resistance so that Y vertical silicon controlled rectifiers on the grid cannot be latched ON by completing a circuit through the sensor.

DESCRIPTION OF THE PREFERRED EMBODIMENT

The matrix arrangement within which the present invention is utilized is generally of the type disclosed in U.S. Pat. No. 3,851,124 issued to R. C. J. Garavalia on Nov. 26, 1974 and consists of matrices of magnetic latching reed relays.

The reed relays are grouped into a basic unit of 16 reed relays in a 4 × 4 arrangement called an array. These arrays are then arranged on a grid card that includes 8 such arrays or 128 reed relays. See FIG. 4. Four such grid cards are then organized into a quad and four such quads make up a module. Thus each module includes 16 grid cards. Paths through this network are selected by a network controller by selecting a module (leads DM$n$, FIG. 3) to narrow the path to a single module; a grid select lead (DGA$n$); and finally to the particular X and Y switch numbers (leads DXS$n$ and DYS$n$) and the X and Y verticals (leads DXV$n$ and DYV$n$) numbers to pick the paths in the grid array.

Figure 3:
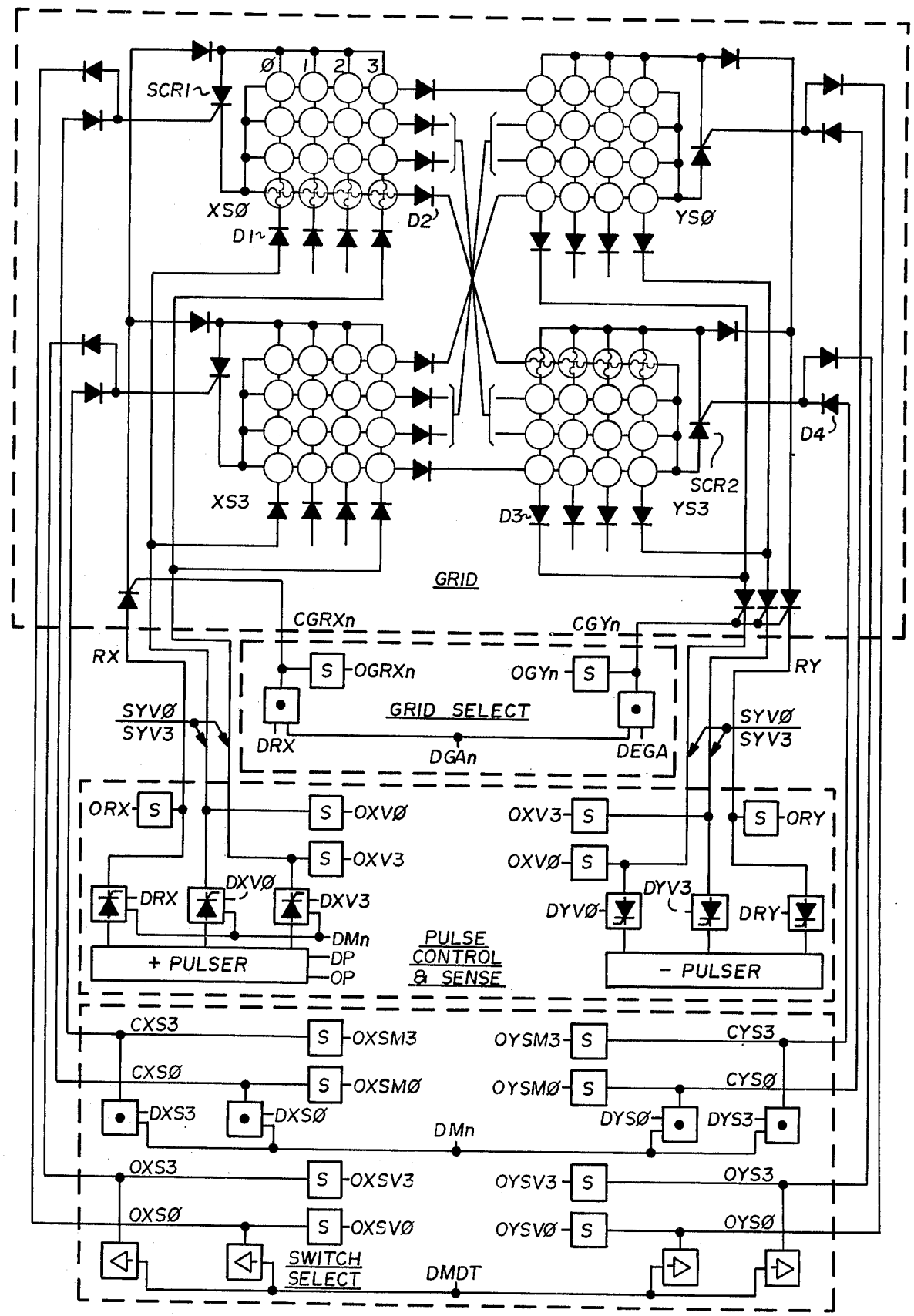
FIG. 3 is a simplified schematic of the switching matrix with its associated control and sensing circuits.
Figure 4:
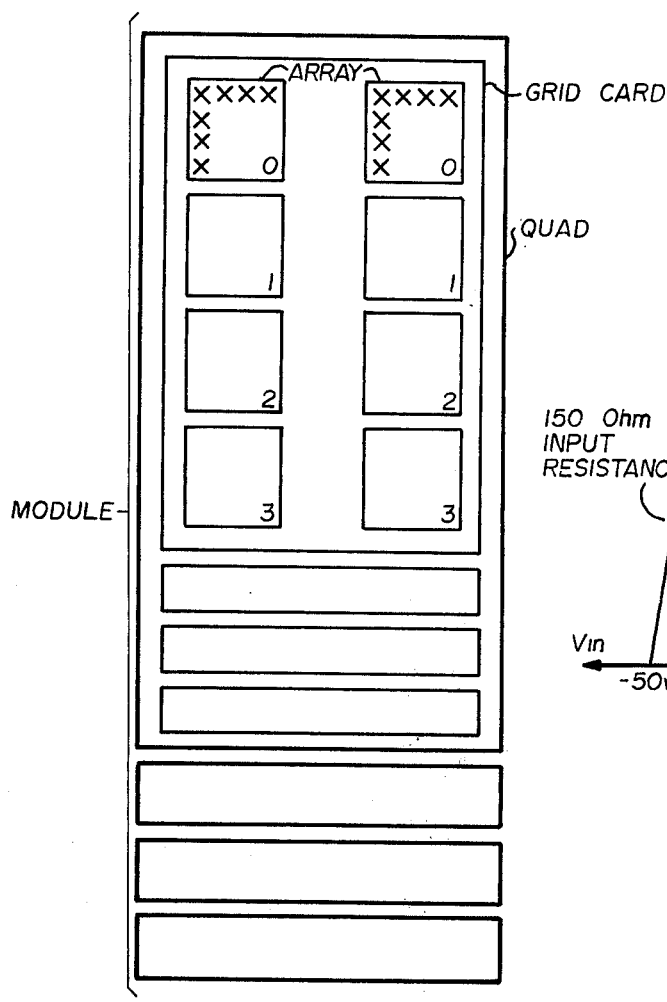
FIG. 4 is a block figure showing the relationship of the matrix groups.
Figure 5:
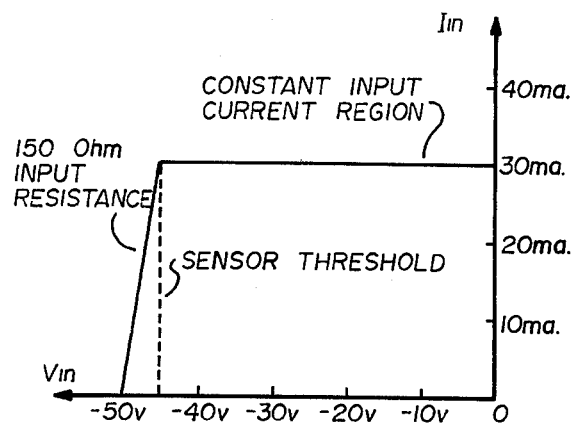
FIG. 5 is a chart showing the current limiting of the sensor.

A series pulse-path through a selected X-switch and Y-switch is established from the + pulser to the − pulser, provided that the proper control gates to select the grid, X-switch, Y-switch, X-vertical and Y-vertical have been enabled, see FIG. 3.

Control data for the proper grid selection is generated in the controller logic frame by the combination of address data, micro-order data and control levels.

Address data are available for the full duration of a network execution cycle and are made up of the network inlet terminal address, the outlet address, and the network link choice. The controller logic determines what part of the above address data is pertinent for a given type of mixer-frame.

Figure 6:
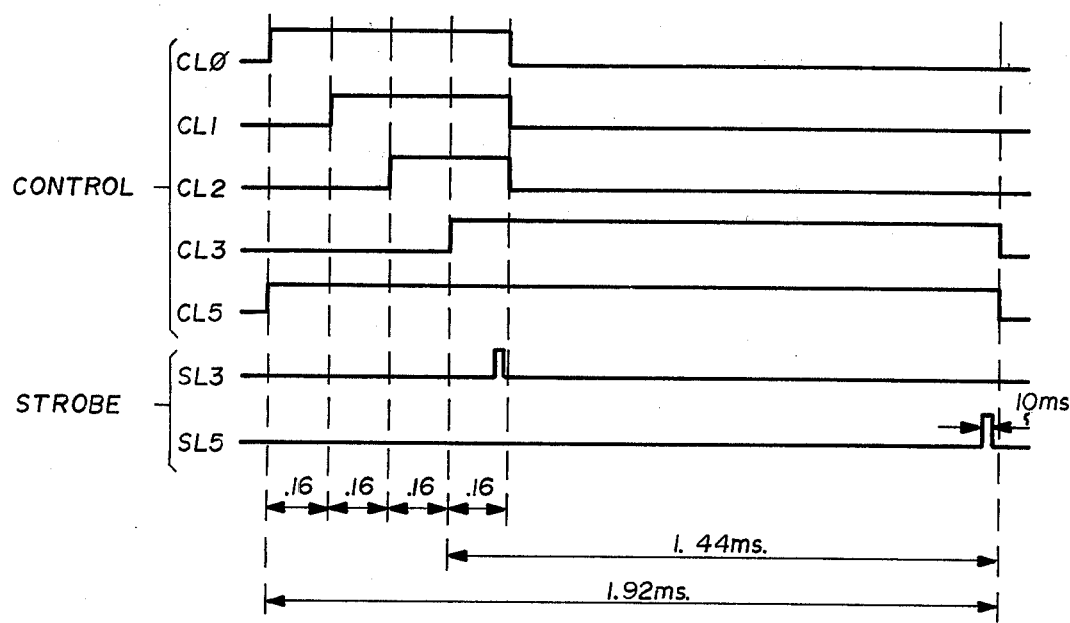
FIG. 6 is a chart showing the relationship of the control and strobe pulses for operating the network.

The timing-levels used for the operation of the mixer-frames are CL 0, 1, 2, 3 and 5 and are related as shown on FIG. 6. These levels are present during the execution of any memory order word.

Following now, an example will be given of a set X and set Y crosspoint operation. This set-set operation is performed by executing a series of consecutive switching actions where each step enables additional control gates until the final crosspoint selection, pulse action and magnetic crosspoint latching takes place. The gates of the matrix control and their inputs are shown on FIG. 3.

Step 1. This is the normal idle state where the address data DM$n$ and DGA$n$ are present but on switching action is performed.

Step 2. As control level CL0 becomes true it activates lead DEGA and one of the leads DYS, such as DYS3. Lead DEGA enables the selected CGY switches common to all 4 modules to select the particular grid in the modules, lead DYS3 enables the selected gates YS on all 16 grid assemblies in the selected module to prepare the SCR's associated with arrays YS3 in each module for conduction. The associated OGY, OYSM and OYSV sensor outputs become true. At clock pulse CL5 one lead DYV3 is activated and the −pulse potential passes into the selected Y-switch. The associated OYV3 sensor output becomes true.

Step 3. Control level CL1 activates one DXS signal such as DXS0 which enables the selected CSX0 gates on all 16 grid assemblies in the selected module to prepare the SCR's associated with arrays XS0 in each module for conduction. The appropriate OXSM and OXSV sensor outputs become true.

Step 4. Control level CL2 activates one DXV such as DXV0 signal and the appropriate OXV0 sensor output becomes true.

The crosspoint selection has at this point been completed.

Step 5. At control level CL3 the DP signal to the +pulser is applied and a pulse current is applied through the selected crosspoints of XS0 and YS3 in the selected module and grid.

The pulse output OP becomes true.

Strobe level SL3 latches-up the information of the OGY sensor outputs of which only the one selected output should be true.

Step 6. Control levles CL0, 1 and 2 are deactivated and consequently also the data levels DEGA, DYS, DXS and DXV. The pulse current is provided via the active DP and DYV signals and the active SCR devices in the pulse-path stay latched-up as long as the pulse current is present. At the end of this interval, strobe level SL5 latches-up the information of the remaining sensor outputs which should all be true for the common as well as the selected signals.

The combined duration of steps 5 and 6 which turns on the pulse current is 1.44 ms (CL5) and is sufficient to latch up the MLR crosspoint devices. The operation now returns to the idle state step 1.

As is evident from the preceding brief description of the setting up of a path through the matrix, a large number of sensors are located in the frame to monitor the various steps of the path selection operation. These sensors could be adversely affected by the leakage currents from the silicon controlled rectifiers of the unselected grids, or malfunctioning components such as shorted diodes. In the pulsing path there is a leakage from 15 unselected cards into the common Y vertical leads.

The circuit here described controls this cumulative leakage from the silicon controlled rectifiers to prevent it from turning on one or more the Y vertical sensors. With this circuit arrangement the leakage is shorted around the Y vertical sensors, thus permitting them to have a high input resistance to also prevent a Y vertical silicon controlled rectifier from being latched ON by a circuit path through the sensor.

Figure 2:
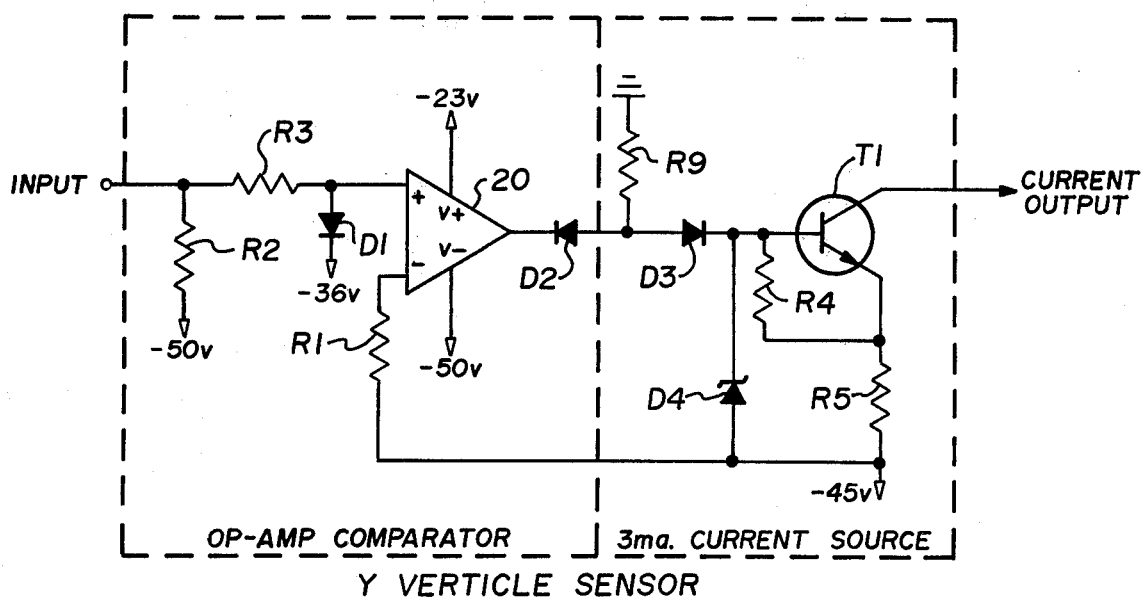
FIG. 2 is a schematic of a high input resistance sensor used in the present invention.

The circuit of FIG. 2 shows a high input impedance sensor corresponding to the sensors of FIG. 3 having input leads OYV0 through OYV3 and connected to the outputs of the negative pulser switches having input leads labeled DYV0 through DYV3. It essentially consists of a comparator, 20, having its negative input tied to −45 volts via resistor R1 and its positive input tied to a negative 50 volts via a relatively high resistance R2 of about 10,000 ohms and clamped at a negative 36 volts via diode D1 to protect the amplifier, 20. Resistor R3 serves only as a current limiter for the input current when the comparator 20 goes into the clamp mode.

When a V vertical signal is present the signal input goes positive and the comparator 20 output goes high. This reverse biases diode D2 and transistor T1 is turned on via resistor R9 and diode D3 to provide a signal to external equipment. When a signal is not present on the input the comparator output is low and diode D2 is forward biased and diode D3 is reverse biased shutting off transistor T1. Zener diode D4 serves only to set the maximum current level for transistor T1, while resistor R5 sets the current level. Resistor R4 assures transistor T1 staying off.

Figure 1:
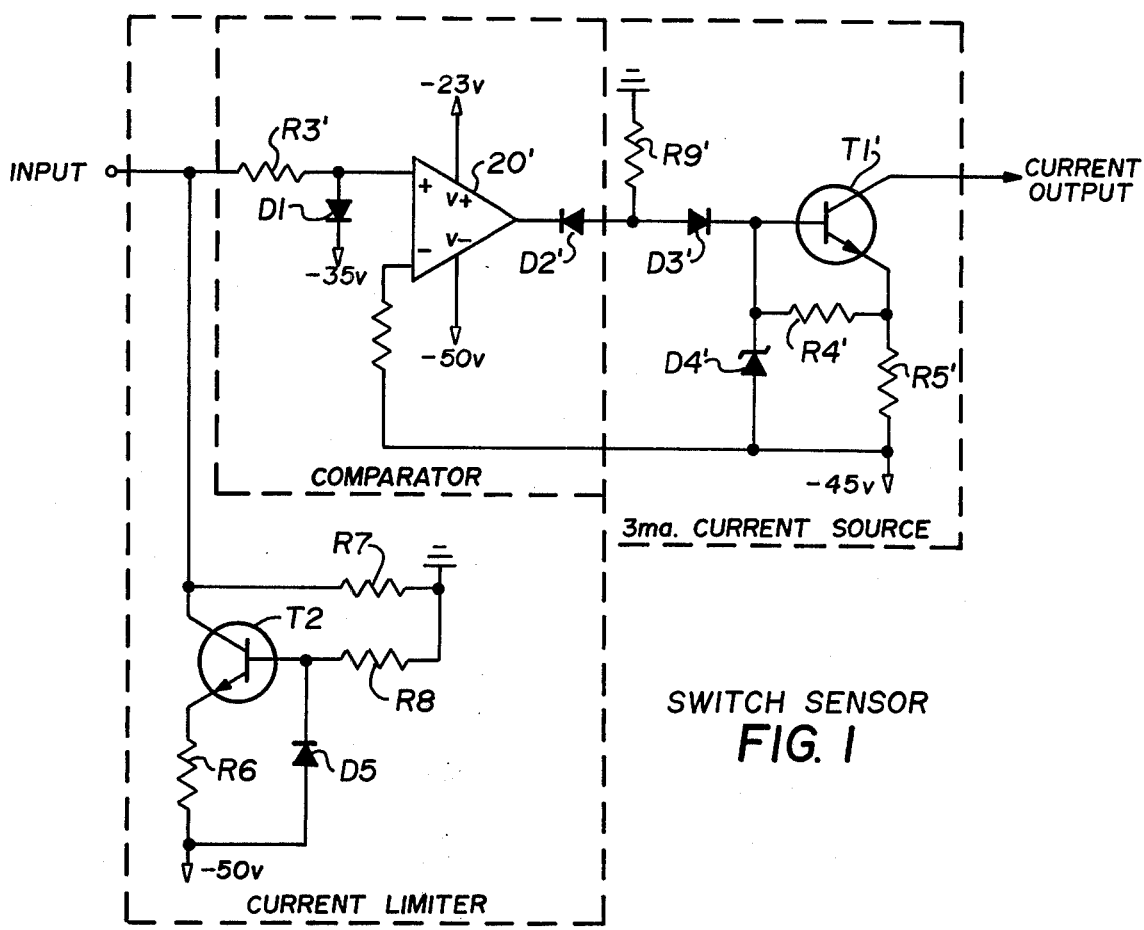
FIG. 1 is a schematic of the sensor and current limiter used in the present invention.

The comparator and output current source of the circuit of FIG. 1 operate in the same manner as that of the circuit of FIG. 2 and are accordingly labeled in the same manner but with a prime added. However this circuit has the additional circuitry associated with transistor T2 connected to its input. This portion of the total circuit provides the shunting for the leakage currents. Transistor T2 is in a saturated mode whenever the input is below a negative 45 volts, the unselected state. During this time the input resistance is essentially determined by the value of resistor R6, about 100 ohms. Thus the leakage currents from the unselected paths have a low resistance shunt path.

When the input level passes the negative 45 volt level in the positive direction such as when the corresponding vertical is selected then transistor T2 goes into its active mode and acts as a current source limiting the current to a level of approximately 30 mils. This value is necessary because some of the inputs may swing in the positive direction to a value approaching positive 50 volts, and the corresponding high current could shunt out the pulser current.

The components associated with transistor T2 are resistor R8 which supplies the bias, while diode D5 serves to set the maximum current level. Resistor R7 serves only to supply some additional current to transistor T2 to help it go into saturation.

While a particular embodiment of the invention has been shown and described, modifications may be made, and it is intended in the appended claims to cover all such modifications as may fall within the true spirit and scope of the invention.

What is claimed is:

1. In a crosspoint matrix arrangement for a space-divided communication switching network that includes a plurality of arrays of crosspoint connections having input terminals and output terminals, said arrays of crosspoints including a four by four matrix arrangement of four input terminal connections, four output terminal connections and 16 interior crosspoints, said matrix arrangement comprising a first plurality of said arrays, said arrays being associated in first and second space-divided switching stages for said first order switching means, a predetermined number of said arrays corresponding to the number of input terminal connections for each of said arrays providing a space-related grouping of said arrays within said first stage, each of said arrays within a selected space-related grouping of said first stage having an output terminal thereof connected to an input terminal of each of said arrays within an associated one of said identical space-related groups of said second stage array, respectively, a plurality of said space-related groupings provided in each of said first order switching means, said plurality thereof being equal in number to the number of input terminal connections of said first stage; each of said crosspoints including a first and a second inductive winding means, said first winding means of each abscissa order of four of said crosspoints of each said array connected in a first series path, said second winding means of each ordinate order of four of said crosspoints of each said array connected in a second series path, an individual one of a plurality of first switch means associated with each array, one terminal of each said series ordinate order paths in each array connected in common to a first terminal of said associated first switch means, one terminal of each said series abscissa order paths in each array connected in common to a second terminal of said associated first switch means, a second terminal of each said series ordinate paths of said arrays of said first switching stages individually connected to a corresponding array second terminal of each series ordinate path of said second switching stages, a first plurality of operate current pulse means, a second terminal of each said corresponding series abscissa paths of said first switching stage arrays connected together and to a corresponding first operate curent pulse means, a second plurality of operate current pulse sinks, a second terminal of each said corresponding series abscissa paths of said second switching stage arrays connected together and to a corresponding second operate current pulse sink, first means operated to selectively enable a particular one of said first plurality of operate pulse means and a particular one of said second plurality of operate current pulse sinks, second means to selectively enable a particular one of said plurality of first switch means associated with said first switching stages and a particular one associated with said second switching stages to thereby complete a current path through said first and said second winding means in a crosspoint in said corresponding arrays between selected current pulse means and said current pulse sink, to operate said selected crosspoints, and sensing means connected to each of said operate current pulse sinks, operated to produce an output upon sensing a completed current path through selected crosspoints.

2. In a crosspoint matrix arrangement as claimed in claim 1 wherein said sensing means comprises a differential amplifier having a first input connected to said pulse current sink, a negative bias means connected to said first input, an amplifier stage having an input and an output, said amplifier input connected to said differential amplifier output, with said output providing an indication of the operating status of said differential amplifier input.

3. In a crosspoint matrix arrangement as claimed in claim 1 wherein said first switch means comprises a silicon controlled rectifier having an anode, a cathode and a gate electrode.

4. In a crosspoint matrix arrangement as claimed in claim 3 further including a current limiting sensing means connected to the gate electrodes of said first switch means associated with said second switching stages.

5. In a crosspoint matrix arrangement as claimed in claim 4 wherein said current limiting sensing means includes a differential amplifier having a first input connected to said gate electrode, and a current limited source connected to said gate electrode, a negative bias means connected to said first input, and a reference voltage level means connected to said differential amplifier second input, said current limited source operated to draw away any leakage current possibly present from said silicon controlled rectifier.

* * * * *